United States Patent Office 3,472,913
Patented Oct. 14, 1969

3,472,913
POLYTHIOL COMPOSITION AND PREPARATION THEREOF
Salim N. Ephraim, Elizabeth, N.J., assignor, by mesne assignments, to The Dow Chemical Company, a corporation of Delaware
No Drawing. Continuation-in-part of application Ser. No. 430,471, Feb. 4, 1965. This application Dec. 14, 1967, Ser. No. 690,422
The portion of the term of the patent subsequent to Jan. 2, 1985, has been disclaimed
Int. Cl. C08g 30/10, 23/00
U.S. Cl. 260—830                  10 Claims

ABSTRACT OF THE DISCLOSURE

A polythiol, prepared by reacting an organic compound having at least one active hydrogen with an halogen-bearing epoxide and converting the halogen groups of the resulting products to thiols, and characterized by a molecular weight of at least about 1000 and by a theoretical thiol:hydroxyl mole ratio of more than one.

BRIEF DESCRIPTION OF THE INVENTION

This application is a continuation-in-part of application Ser. No. 430,471, filed Feb. 4, 1965, now U.S. Patent No. 3,361,723, issued Jan. 2, 1968.

The present invention relates to improved polythiols having a molecular weight of at least about 1000 and a theoretical thiol:hydroxyl mole ratio of more than one. More particularly the invention relates to such polythiols of the following structure:

(1)

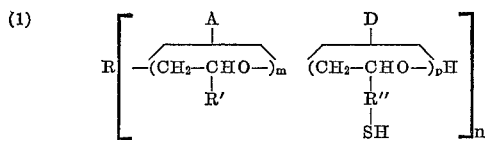

wherein A and D are representative polymeric units, repeating, alternating or both, with either A or D attached to R;

R is an organic radical derivable by the removal of at least one hydrogen atom from an organic compound having one or more active hydrogen atoms, R' is a hydrogen, alkyl or aryl radical, and R" is an alkylene radical; and $m$ is zero or a positive integer, $p$ is a positive integer, and $n$ is equal to the number of hydrogen atoms removed to form R.

BACKGROUND OF THE DISCLOSURE

Polythiols, and particularly thiol-containing polyethers, such as those disclosed in copending application Ser. No. 430,471, now Patent No. 3,361,723 find utility in preparing high polymers and elastomeric compositions suitable for use as sealants, caulking compositions, coatings, and in many other important applications.

One method of preparing polythiols, as disclosed for example in U.S. Patents No. 3,258,495 and 3,278,496, involves adding to a polyether prepolymer having three or more hydroxy groups an equal number of epichlorohydrin molecules, or the like, followed by the conversion of the chlorine groups of the resulting product to thiols, for example, by reaction with sodium hydrosulfide. Such a process is exemplified by the following reactions:

(2)
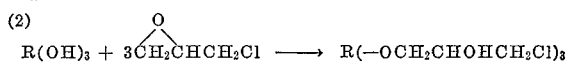

(3)
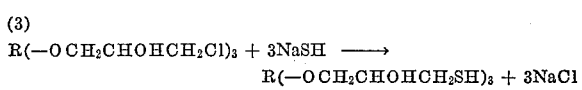

The polythiol produced by the reaction of Formula 3 is characterized by terminal thiohydrins, that is, terminal thiols having a hydroxyl group on the beta carbon atom.

It has been found that terminal thiohydrins may preclude maximum utilization of the thiol groups in the uses of polythiols above described, and in general thiohydrin groups are undesirable. Thus, in copending application Ser. No. 430,471, now Patent No. 3,361,723 there are disclosed and claimed polythiol compositions without thiohydrins and having desired physical characteristics.

Moreover, it has also been found that hydroxyl groups in general are also undesirable in polythiols, and that it is preferable to reduce the hydroxyl:thiol ratio as much as possible. Cured polythiols having a relatively high hydroxyl content tend to be highly hydrophilic and, characteristically, have higher water absorptivity, giving rise to poor hydrolytic stability as well as high water vapor transmissivity.

Another reference, U.S. Patent No. 2,581,464, describes the preparation of polyhalohydrin ethers similar to the products of Equation 2 above but having internal halogen groups as well as terminal halogen groups. Such a reaction is exemplified as follows:

(4)
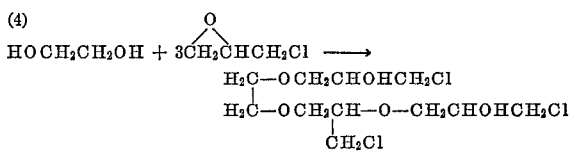

The polyhalohydrin ether product of Equation 4 can be converted to a polythiol, as the above patent incidentally implies (column 10, lines 3–9), as follows:

(5)
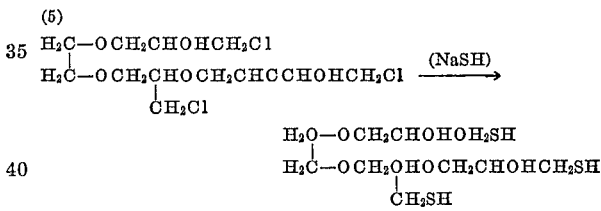

It has been found that the above reaction (5) under carefully controlled conditions can yield a product, which due to the fact that one thiol group is internal, rather than terminal, is characterized by a relatively low hydroxyl:thiol ratio. However, the polyhalohydrin ethers of the above patent, described in Examples 1–26 thereof, when converted to polythiols and cured, even under carefully controlled conditions, are not suitable for preparation of elastomeric products. Rather, such cured polythiols are hard and brittle, with little or no elastic extensibility.

The copending, parent application of the instant application, Ser. No. 430,471, now Patent No. 3,361,723 disclosed and claimed polythiol compositions without terminal thiohydrin groups. This copending application also disclosed polythiols having a theoretical thiol:hydroxyl ratio of more than one. Further, that application disclosed new and improved processes for obtaining polythiols, whereby the thiol groups may be located as desired at any point along the polymer molecule, and need not be limited to terminal or nearly terminal positions, as the prior art would lead one to believe is required. These novel processes may be employed to prepare the compositions of this invention, which also may be prepared by more conventional methods, as described below.

It is the object of this invention to provide polythiols, that is, thiol-bearing polymeric intermediates, having a minimum of hydroxyl groups. It is a further object of this invention to provide thiol-bearing polymeric intermediates which have minimum water absorption and maximum hydrolytic stability. Another object of this invention is to provide a process for manufacturing thiol-bearing polymeric intermediates that can be cured into elastomeric products suitable for sealants, coatings, adhesives and related applications.

DETAILED DESCRIPTION OF THE INVENTION

Broadly stated, the process of the present invention involves forming a polyether material having pendant functional groups which are convertible to thiol (SH) groups. In the usual case, the polyether is formed by polymerization of an oxirane or epoxy material, having such functional groups, in the presence of an organic compound having one or more active hydrogen atoms. The pendant functional groups, preferably halogen atoms, such as chlorine or bromine, should, of course, be unreactive to the oxirane group. The process is generally carried out in the presence of a catalyst, preferably an acid catalyst.

Suitable oxirane or epoxy materials bearing such functional groups are the epihalohydrins or other halogen-bearing epoxides, the preferred material being epichlorohydrin, in which case, of course, the functional group is chlorine. The functional groups are incorporated into the polymer molecule by reaction with an initiator, an organic compound having one or more active hydrogen atoms, as follows:

(6)

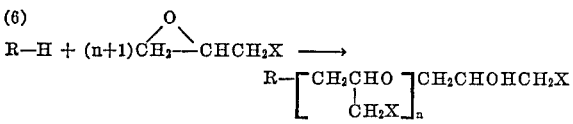

wherein R—H is a compound, such as methanol, having a single active hydrogen atom, and X is a functional group, such as chlorine, convertible to a thiol group.

With reference to Equation 6 above, it has been found that any number of functional groups may be added, with only the terminal group being associated with a hydroxyl group. Thus it is possible to control the theoretical thiol:hydroxyl ratio of the ultimate polythiol. In accordance with the present invention, the theoretical thiol: hydroxyl ratio is more than one. Therefore, it is generally necessary that the number of functional groups present on or added to the initiator be greater than the total number of active hydrogen atoms removed from the initiating organic compound. Thus, for an initiator having two active hydrogen atoms, a reaction in accordance with the present process would proceed as follows:

(7)

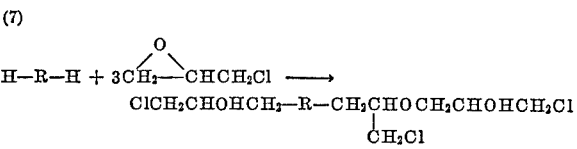

wherein H—R—H is an organic compound, such as a propylene ether diol, having two active atoms. The product of Equation 7 above may be converted to a polythiol, as follows:

(8)

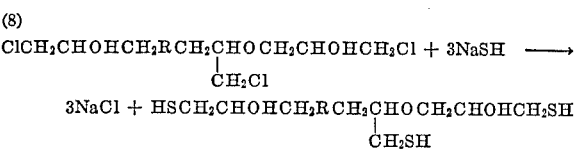

In accordance with the present process, the thiol groups of the ultimate polythiol may be located as desired along the polymer molecule. This is achieved by incorporating alkylene oxides or oxiranes, without functional groups convertible to thiols, as desired along the molecule. Consequently, the addition of epihalohydrins to an initiator may be preceded, followed, or alternated with the addition of alkylene oxides to yield polyethers containing halogens at predetermined patterns. For example, if one mole of epichlorohydrin and one mole of ethylene oxide are alternatively added to an initiator, there would predominantly be obtained the following polymeric product.

(9)

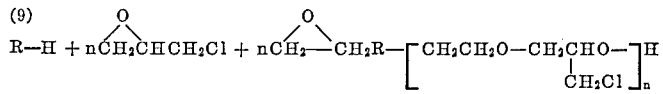

As a further example, two moles of epichlorohydrin could be added to the initiator, followed by 10 moles of ethylene oxide, and finally followed by two moles of epichlorohydrin, theoretically yielding:

(10)    R—[(CH$_2$CHH—)$_2$(CH$_2$CH$_2$O—)$_{10}$(CH$_2$CHO—)$_2$]H
                                                    |
                 CH$_2$Cl                          CH$_2$Cl

It will be clear to those of the art both that the variety of polythiols obtainable in accordance with the present process is virtually endless and that it is theoretically possible to incorporate thiol groups as desired at any location along the final thiol-bearing polyether product. It will also be clear that not all of the polymer molecules are formed in accordance with the above theoretical equations, but that the above reactions illustrate only typical products.

Further, practical limitations may make undesirable the addition seriatim of a number of reactants, and it may be preferable to add at once certain proportions of reactants to obtain a product having thiol groups randomly distributed along the fabricated polymer molecule. And, of course, in some instances it may be desirable to have the thiol groups near the end of the molecules, which is readily achieved by the utilization of a prepolymer initiator. In any event, the thiol-bearing products of the present invention are characterized by a molecular weight of at least about 1000 and a theoretical thiol: hydroxyl ratio of more than one.

In some cases, it may be preferred to prepare the present products in accordance with a one-step process. Thus, a thiol-bearing polyether may be prepared by changing at once into a single reactor an initiator, a compound such as epichlorohydrin bearing a functional groups, and an alkylene oxide.

Further variations of the nature of the ultimate polythiol are possible. For example, the initiator may contain functional groups as well as active hydrogen atoms. Typical compounds of such requirements are ethylene chlorohydrin and glycerin dichloride. A typical reaction would be as follows:

(11)

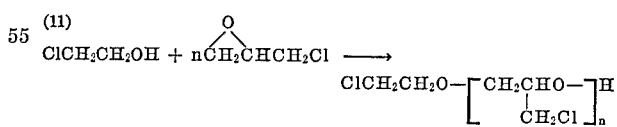

Conversion of the functional groups to thiols may then proceed as above to yield a product having a thiol group attached to the original initiator unit.

Further variations may be obtained by replacing a part or all of the alkylene oxide or epihalohydrin with a diepoxide or a polyepoxide. In the case of polyepoxide, however, addition to active hydrogen compounds proceeds along two or more sites giving rise to chain extension as well as cross-linking between two or more chains. Thus, if one mole of butadiene dioxide were added to two moles of the product of, say, Equation 9 above, the following reaction would predominate:

(12)

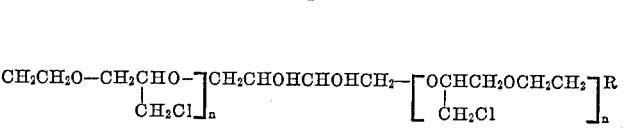

Also, the product of Equation 12 may be extended by addition of further amounts of alkylene oxide or epichlorohydrin or crosslinked by addition of further amounts of polyepoxide.

In making the intermediate homo-and co-polymers bearing the convertible functional groups according to this invention, the monomeric material or mixtures thereof and the catalyst may simply be charged into a closed vessel and heated until polymerization is complete. In the case where a copolymer is being formed depending upon the nature of the desired product, the monomers or prepolymer may be charged simultaneously or consecutively or alternatively one or the other in whatever mole ratios are desired. The reaction mass is advantageously agitated during polymerization. The proportion of catalyst may vary from 0.5 to 15 percent by weight of the epoxide, 1 to 5 percent being preferred. Polymerization may be carried out at a temperature in the range of 0 to 200° C., with 20 to 100° C. being preferred.

Instead of effecting mass or bulk polymerization as described above, the process may be carried out with the monomeric or polymeric reactants, catalyst and polymer product all dissolved or suspended in an inert diluent. In general, equal proportions of reactants and diluent are used. Suitable diluents are diethyl ether, diisopropyl ether, petroleum ether, benzene and n-hexane. It is advantageous to choose a diluent which boils at about polymerization temperature, and to heat the mass to induce gentle reflux, thereby assisting in the close control of the reaction temperature.

Examples of suitable initiators are: aliphatic monohydric alcohols, such as methanol, ethanol, 2-butanol and 1-octanol; alcohol ethers, such as methyl cellosolve and ethyl cellosolve; aliphatic polyhydric alcohols, such as ethylene glycol, 1,3-butanediol, 1,4-butanediol, glycerol and sorbitol; hydroxyl-terminated polyethers, such as polyethylene glycols, polypropylene glycols, polybutylene glycols and dihydroxypropyl ether of bisphenol A; hydroxyl-terminated polyesters, resulting from reaction of polybasic carboxylic acids with polyhydric alcohols, such as polyethylene glycol adipate and polyglycerol phthalate; haloalcohols, such as ethylene chlorohydrin and glycerol dichloride; monohydric phenols, such as phenol, xylenol and p-chlorophenol; dihydric mononuclear phenols, such as resorcinol and hydroquinone; polyhydric mononuclear phenols, such as phloroglucinol; dihydric dinuclear phenols, such as bisphenol A and bis-p-hydroxyphenyl methane; polyhydric polynuclear phenols, such as phenolic novolacs made by condensation of phenol with formaldehyde under acid conditions; monocarboxylic acids, such as acetic acid, 2-ethyl hexoic acid and benzoic acid; dicarboxylic acids, such as adipic acid, phthalic acid and oxalic acid; polycarboxylic acids, such as citric acid; carboxyl-terminated polyesters such as those prepared by reaction of polybasic acids with polyhydric alcohols, said polyesters being terminated with hydroxyl groups, carboxyl groups or both; and hydroxyalkyl amines, such as ethanolamine, diethanolamine, triethanolamine and dihydroxyethyl aniline.

Examples of monomeric halogen-bearing epoxide compounds suitable for the present process are epichlorohydrin, 1,2-epoxy-4-chlorobutane and the like, and epibromohydrin. Examples of suitable epoxides for use in copolymerization with halogen-bearing epoxide in accordance with the present process are: alkylene oxides, such as ethylene oxide, propylene oxide, 1,2-butylene oxide, 2,3-butylene oxide and octylene oxide; cycloalkylene oxides, such as cyclohexene oxide; aryl substituted oxides, such as styrene oxide and glycidol; glycidyl ethers, such as methyl glycidyl ether, allyl glycidyl ether and phenyl glycidyl ether; diepoxides, such as vinyl cyclohexene dioxide and bicyclopentadiene dioxide; and polyglycidyl ethers, such as the diglycidyl ether of bisphenol A, butanediol diglycidyl ether and trimethylol-propane triglycidyl ether.

Examples of catalysts suitable for the polymerization reaction include: Lewis-type acids and organometallic products exhibiting the reactivity of Lewis acids, such as $BF_3$, $AlCl_3$, $SnCl_4$, $ZnCl_2$, $FeCl_2$, $FeCl_3$, $FeBr_2$, $FeBr_3$, $BeCl_2$, $BCl_3$, $SbCl_5$, $TiCl_4$, $CoCl_2$, $NiCl_2$, $BiCl_2$, $InCl_3$, $ZrCl_4$, titanium tetraalkyl esters, aluminum alkyls and aluminum alkoxides, diethyl zinc in combination with alumina, or oxygen, HF and complexes of HF with $PF_5$, protonic acids and acid salts such as sulfuric acid, and sodium hydrogen sulfate, and acid clays. Basic catalysts and basic salts of weak acids may also be used to polymerize alkylene oxides, but not epihalohydrins, since in the case of the latter, dihydrohalogination occurs. Examples of basic catalysts applicable to alkylene oxide polymerization are: alkalies, such as sodium hydroxide, lithium hydroxide and potassium hydroxide; alkali salts of weak acids, such as sodium carbonate, alkaline earth carbonates, sodium methoxide and potassium methoxide.

The polymer formation step discussed above yields products of various configurations having functional groups, such as halogen-bearing polymers. Reaction of these halogen-bearing polymers with alkali hydrosulfides results in the displacement of these halogens with thiol groups, and hence the thiol-terminated or thiol-containing polyether products of this invention are obtained.

Suitable alkali hydrosulfides include sodium hydrosulfide, potassium hydrosulfide and lithium hydrosulfide.

The reaction with alkali hydrosulfides may be carried out in bulk, in aqueous solution, or as a suspension or solution in an organic solvent. In bulk reactions, the alkali hydrosulfide is added in the form of flakes to the halogen-bearing polymer and the mixture is agitated at 40–100° C., for 1–5 hours, depending upon the nature of the halogen-bearing intermediate. Progress of the reaction may be observed by the disappearance of the yellow color of the hydrosulfide flakes and the appearance of white sodium chloride crystals. Upon completion of the reaction, residual alkali hydrosulfide and sodium chloride are removed either by repeated washing with pure water followed by removal of volatile matter with heat and vacuum, or by removal of water and volatile matter with heat and vacuum followed by filtration.

Alternatively, the alkali hydrosulfide may be added in the form of an aqueous solution to the halogen-bearing polymer, and the reaction and purification of the product carried out as explained above under bulk polymerization.

The use of an organic solvent as a medium for the halogen-bearing polymer with alkali hydrosulfide yields optimum results. The alkali hydrosulfide may be either soluble in the organic solvent such as methanol, or insoluble in the solvent, as is the case with higher alcohols such as isopropanol or normal butanol. Purification of the product is simplified a great deal, particularly in the case of the latter solvents. For example isopropanol at a ratio of 10–100 percent of the halogen-bearing polymer may be added to the latter, followed by addition of alkali hydrosulfide flakes, and the reaction may be carried out at 35–85° C. for 1–5 hours depending upon the nature of the halogen-bearing polymer. Upon completion of the reaction, sufficient water is added to dissolve residual alkali hydrosulfide and the salt, and the reaction medium separates into two phases. The upper phase consists of a solution of the product in isopropanol, and the bottom phase consists of a solution of salt and residual alkali hydrosulfide in water. The bottom phase is drained off and discarded, and the upper layer is subjected to heat and vacuum whereby the isopropanol and other volatile matter are removed to leave a substantially pure product.

The thiol-bearing polyethers obtained by the above processes usually have a pH of 7–9. Since polythiols tend to polymerize by air oxidation at high pH, it is often advantageous to add a weak acid to the thiol-bearing polyether obtained by the present process to reduce pH and thereby to inhance stability. A preferred pH is 4–7. It is well known to those acquainted with the art that acids promote polyether scission and therefore the addition of acids to thiol-bearing polyethers may result in degradation. However, it has been discovered that boric acid has no effect whatsoever upon the stability of thiol-bearing polyethers of this invention. Therefore, boric acid may be used to reduce the pH of the thiol-bearing polyether to the above preferred level.

Generally, stoichiometric or higher quantities of alkali hydrosulfide are preferable in the reaction with the halogenated intermediate. However, quantities lower than stoichiometric can also be used if it is desired to leave some of the halogens as such and without conversion to the thiol group.

The polythiols of this invention have a wide range of valuable applications, for example, these polymers can be extended, crosslinked, or cured with addition of various oxidizing agents such as lead oxides, organic peroxides, quinones or the like, thereby yielding thermosetting compositions that are valuable as adhesives, caulking compounds, protective coatings, casting and encapsulating media and many others.

Also the thiol-bearing polymers of this invention can be readily crosslinked with epoxy resins, particularly in the presence of basic catalysts, to yield valuable copolymers.

By virtue of their active hydrogens these thiol-bearing polymers of this invention can be crosslinked with a variety of other active agents such as isocyanates, ketenes, polybasic carboxylic acids and anhydrides or the like. Thus it is that the thiol polymers of this invention are valuable thermosetting intermediates.

The polymers of the present invention are generally clear and light in color. Moreover, these new thiol-bearing polymers are extremely versatile in comparison to the older types. For example, while the thiol-terminated polymers known heretofore are limited to a few thiol groups per mole, the new thiol-bearing polymers of this invention may have as many thiol groups as desired. Thus, depending upon the number of thiol groups per mole, the new thiol-bearing polymers can be crosslinked to yield products ranging from hard, tough plastics to very flexible elastomers. The uniformity, structural diversity, and high thiol:hydroxyl ratio of the new thiol-bearing polymers are clearly borne out by their physical properties upon cure.

The following examples further illustrate the process and polymer products of this invention. The thiol content of the products obtained in the examples that follow are expressed in milliequivalents thiol per gram of product, and are determined by titrating 1–2 grams of the product, as a solution in 50 ml. of isopropanol, with 0.1 N iodine solution (Harleco No. 1254A), up to the point where the yellowish iodine color persists for more than 30 seconds. The thiol content in milliequivalents thiol per gram of sample is calculated by dividing one tenth of the volume of iodine solution used (in milliliters) by the weight of the sample in grams.

EXAMPLE I 38 grams (0.5 moles) of methyl cellosolve are charged into a liter flask provided with an agitator, thermometer, reflux condenser, and a heating mantle. 8 grams of stannic chloride pentahydrate are added, and the mixture is heated to 40° C., whereby the stannic chloride is fully dissolved. Heating is then discontinued, and 46.2 grams (0.5 moles) of epichlorohydrin are added over a period of 10 minutes. The reaction is highly exothermic and external cooling is applied to keep the temperature at about 60° C. After adding all of the epichlorohydrin, 290 grams (5 moles) of propylene oxide are added over a period of 15 minutes. Again the reaction is exothermic, and external cooling is applied to keep the temperature at about 60° C. After all of the propylene oxide is added, 92.5 grams (1 mole) of epichlorohydrin are added and the reaction mixture kept at 60° C. for one-half hour. 200 grams of isopropanol and 160 grams (2 moles) of 70 percent aqueous sodium hydrosulfide flakes are then added, and the temperature is kept at 40–45° C. for two hours. Heat is then increased, and the temperature is raised to 80° C. and kept at 80° C. for one hour. Heating is then discontinued, and 400 grams of water are added to the reaction mixture. After 5 minutes of agitation, all of the salt byproduct and residual sodium hydrosulfide are fully dissolved. Agitation is then discontinued, and the reaction mass is separated into two distinct layers. The bottom layer, which is the aqueous phase containing dissolved salt and sodium hydrosulfide, is drained off and discarded. Two grams of boric acid are added to the remaining top layer which contains the product in isopropanol solution, and the mixture is subjected to vacuum distillation whereby the isopropanol as well as other volatile matter is distilled off. At the end of the distillation, the product is kept at 130° C. and 29 inches of vacuum for one hour in order to remove the last traces of volatiles. Three grams of filteraid are then added, and the product is filtered while hot. 425 grams of a light amber semiviscous thiol-bearing polyether, having a molecular weight of about 1000, are obtained, characterized by a thiol content of 2.1 milliequivalents thiol per gram. The predominent molecular species in the product is believed to have the following structure:

(13)
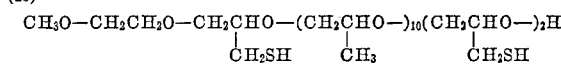

The theoretical thiol:hydroxyl ratio of the above polythiol is 3:1.

EXAMPLE II 45 grams (0.5 moles) of butane-1,4-diol are charged into a 2 liter flask provided with an agitator, condenser, thermometer, and a heating mantle. Agitation is started, and BF$_3$ gas is bubbled for 30 seconds into the diol. 92.5 grams (1 mole) of epichlorohydrin are then added over a period of 10 minutes. The reaction is exothermic, and external cooling is applied to keep the temperature at 60–65° C. After all of the epichlorohydrin is added, 348 grams (6 moles) of propylene oxide are added over a period of 40 minutes, followed by 92.5 grams (1 mole) of epichlorohydrin. The temperature is kept at 60–65° C. with the aid of cooling throughout these additions. Upon adding the last portion of epichlorohydrin, the reaction mixture is kept under agitation at 65° C. for 15 minutes longer in order to complete the reaction. 250 grams of isopropanol and 185 grams (2.3 moles) of 70 percent aqueous sodium hydrosulfide flakes are then added, and the reaction mixture kept under agitation at 45° C. for 2 hours. The temperature is then raised to 80° C. and kept at 80° C. for one hour. Heating is then discontinued, and 400 grams of water are added to the reaction mixture. After 5 minutes of agitation, all of the salt byproduct and residual sodium hydrosulfide are fully dissolved. Agitation is then discontinued, and the reaction mass is separated into two distinct layers. The bottom layer, which is the aqueous phase containing dissolved salt and sodium hydrosulfide, is drained off and discarded. 3 grams of boric acid are added to the remaining top layer which contains the product in isopropanol solution, and the mixture subjected to vacuum distillation, whereby the isopropanol as well as volatile matter are distilled off. At the end of the distillation, the product is kept at 120° C. and 28 inches of vacuum for one hour in order to remove the last traces of volatiles. 3 grams of filteraid are then added, and the product is filtered while hot. A resinous, amber, thiol-bearing polyether is obtained which has a viscosity of 5800 cps. and a thiol content of 2.2 milliequivalents thiol per gram. The predominant molecular species in the product is believed to have the following structure:

(14)

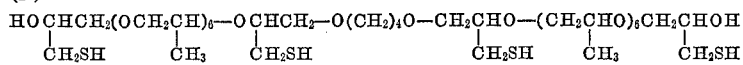

The theoretical thiol:hydroxyyl ratio of the above polythiol is 2:1.

EXAMPLE III 425 grams (1 mole) of a polypropylene glycol having a molecular weight of 425 are charged into a two liter flask provided with an agitator, condenser, thermometer and a heating mantle. 2.2 grams of stannic chloride pentahydrate are then added and the mixture heated with agitation to 60° C. whereby the stannic chloride is fully dissolved. Heat is then discontinued, and 185 grams (2 moles) of epichlorohydrin are added over a period of 30 minutes. The reaction is highly exothermic, and the temperature rises as the epichlorohydrin is added. However, external cooling is applied to keep the temperature below 80° C. Upon adding all of the epichlorohydrin, 116 grams (2 moles) of propylene oxide and two more moles (185 grams) of epichlorohydrin are added under the same conditions. Cooling is then discontinued, and heat is applied to keep the temperature at 80° C. for one-half hour longer to complete the reaction. At the end of this period, 352 grams (4.4 moles) of 70 percent aqueous sodium hydrosulfide flakes are added and the reaction mixture kept under agitation at 75° C. for one hour. Heat and vacuum are then applied, whereby volatile matter is distilled off at 100° C. and 29 inches of vacuum. Vacuum is then broken, and 10 grams of filteraid are added and blended thoroughly, and the product is filtered while hot. A semiviscous amber product, having a molecular weight of about 1000, is obtained which analyzed 1.72 milliequivalents thiol per gram. The predominant molecular species in the product is believed to have the following structure:

(15)

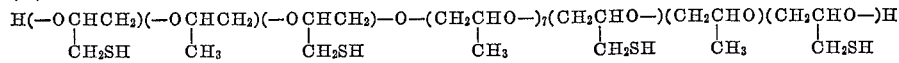

The theoretical thiol:hydroxyl ratio of the above polythiol is 2:1.

EXAMPLE IV 200 grams (0.1 mole) of a polypropylene ether glycol having a molecular weight of 2000 are charged into a liter flask provided with an agitator, condenser, and thermometer. $BF_3$ gas is then bubbled for a few minutes into the glycol while under agitation. The acid number of the $BF_3$ solution in the glycol is found to be 50. 55.5 grams (0.6 moles) of epichlorohydrin are then added over a period of one hour. The reaction is highly exothermic, and the temperature rose to 85° C. However, external cooling is applied, and the temperature is kept at about 60° C. After all of the epichlorohydrin is added, 125 grams (1 mole) of 45 percent aqueous sodium hydrosulfide are added to the reaction mixture, and the temperature is raised to 80° C., and kept at 80° C. for one hour. Heating is then discontinued, and the product washed repeatedly with pure water until a pH of about 8. The product is then subjected to vacuum distillation whereby all volatile matter is removed at 110° C. and 28 inches of vacuum. Heat and vacuum are then discontinued, and the product allowed to cool to room temperature. An amber, viscous product, having a molecular weight of 2500, is obtained which analyzed 1.2 milliequivalents thiol per gram. The theoretical thiol:hydroxyl ratio of this product is 3:1.

EXAMPLE V 1000 grams (1 mole) of a polypropylene ether diol that is terminated with ethylene oxide, offered by the Dow Chemical Company under the designation SA-1417.2, are charged into a three liter flask provided with an agiator, thermometer, condenser, and a heating mantle. The diol is heated to 60° C., and heat is discontinued. 3 grams of stannic chloride pentahydrate are added, and agitation is continued for a few minutes until the latter is fully dissolved. 277.5 grams (3 moles) of epichlorohydrin are then added, and external cooling is applied since the reaction is exothermic. The temperature rises to 85° C., but is brought back to 60° C. with the aid of cooling, and allowed to stay at 60° C. for one-half hour. Next, 350 grams of isopropanol are added as a reaction medium, followed by 265 grams (3.3 moles) of 70 percent aqueous sodium hydrosulfide flakes. The temperature at this stage is 45° C., which is maintained at this level for two hours. Heat is then applied, and the temperature is raised to 80° C. and kept at 80° C. for one hour. Heat is then discontinued, and 750 grams of water are added to the reaction mixture. After 15 minutes, all of the salt byproduct and residual sodium hydrosulfide are fully dissolved. Agitation is then discontinued and the reaction mass is separated into two distinct layers. The bottom layer, which is the aqueous phase containing dissolved salt and sodium hydrosulfide, is drained off and discarded. 5 grams of boric acid are then added to the remaining top layer which contains the product in isopropanol solution, and the mixture is subjected to vacuum distillation, whereby the isopropanol as well as other volatile matter are removed. At the end of the distillation, the product is kept at 130° C. and 28 inches of vacuum for one hour in order to remove the last traces of volatiles. 10 grams of filteraid are then added, and the product is filtered white hot. 1220 grams of a light amber resinous thiol-bearing polyether are obtained, which has a molecular weight of 1300, a viscosity of 1600 cps., a thiol content of 1.5 milliequivalent thiol per gram, and a theoretical thiol:hydroxyl ratio of 1.5:1.

EXAMPLE VI

The process of Example V is repeated in an identical manner except that the polypropylene ether diol is replaced by an equivalent amount of a polypropylene ether diol having a molecular weight of 3000. The thiol-bearing polyether obtained in this manner is found to be a colorless resinous product with a viscosity of 2600 cps., a molecular weight of 3276, and a thiol content of 0.70 milliequivalents thiol per gram. The hydroxyl number of this product is 52. By analysis the product is found to have 2.3 thiols per mole and 3.0 hydroxyls per mole. Thus, while the theoretical thiol:hydroxyl ratio of the product is 1.5:1, the actual thiol:hydroxyl ratio is 0.7:1. This example shows that the above process yields polythiols actually having as much as one-half the theoretical thiol:hydroxyl ratio. This yield is superior to that of several commercial polythiols, some of which have only about one-quarter the thoeretical thiol: hydroxyl ratio.

EXAMPLE VII 7000 grams (1 mole) of a polypropylene ether triol having a molecular weight of 700 (Niax Triol LHT-240) are charged into a 5 liter flask fitted with an agitator, thermometer, reflux condenser and a heating mantle. 2.8 grams of stannic chloride pentahydrate are then added, and the mixture is heated to 60° C., whereby the stannic chloride is fully dissolved. Heat is then discontinued, and 462.5 grams (5 moles) of epichlorohydrin are added over a period of 45 minutes. The reaction is exothermic, and external cooling is applied to keep the temperature at 70–75° C. After adding all of the epichlorohydrin, the reaction mixture is kept at 70° C. for fifteen minutes longer to complete the reaction. 300 grams of isopropanol are then added followed by 462.5 grams (5.8 moles) of 70 percent aqueous sodium hydrosulfide flakes. With these additions, the temperature of the reaction mixture dropped to 45° C. As the sodium hydrosulfide started to react, however, the temperature started rising, but external cooling is applied, and the temperature is maintained at 45° C. for two hours. 1000 grams of water are then added to the reaction mixture, and, after 15 minutes, all of the salt byproduct and residual sodium hydrosulfide are fully dissolved. Agitation is then discontinued, and the reaction mass is separated into two distinct layers. The bottom layer, which is the aqueous phase containing dissolved salt and sodium hydrosulfide, is drained off and discarded. The remaining top layer which contains the product in isopropanol solution is then subjected to vacuum distillation, whereby the isopropanol as well as other volatile matter are removed. At the end of the distillation, the product is kept at 120° C. and 28 inches of vacuum for one hour longer in order to remove the last traces of volatiles. 10 grams of filteraid are then added, and the product is filtered while hot. A viscous amber product, having a molecular weight of 1150, is obtained and is found to analyze 2.25 milliequivalents thiol per gram. The theoretical thiol:hydroxyl ratio of the product is 1.6:1.

EXAMPLE VII 20 grams of the polythiol obtained in Example I are thoroughly blended with 12 parts of a 50 percent lead oxide paste in dibutyl phthalate. The mixture is cast into an aluminum dish and allowed to stand overnight at room temperature. Upon examination, the casting is found to have solidified into a highly elastomeric product with a high degree of extensibility.

EXAMPLE IX 50 grams of the polythiol obtained in Example I are thoroughly mixed with 1 gram of triethylenediamine and 18 grams of an epoxy resin (diglycidyl) ether of bisphenol A, Epi-Rez 510). The mixture is then cast into a metal mold and allowed to stand at room temperature. The casting is found to set within an hour into a tough highly extensible polymer.

EXAMPLE X

The polythiol obtained in Example V is thoroughly compounded with the following ingredients at the ratios given:

| | Gram |
|---|---|
| Polythiol | 100 |
| Triethylene diamine | 2 |
| Coal tar (CP–439) | 75 |
| Carbon black | 200 |
| Epoxy resin (Epi-Rez 510) | 25 |

The mixture is then cast into a metal mold and allowed to stand overnight at room temperature. Upon examination, the casting is found to be a very tough and highly extensible elastomer with a Shore A hardness of 25.

EXAMPLE XI 100 grams of an epoxy resin (diglycidyl ether of bisphenol A, Epon 828) are thoroughly mixed with 12 grams of triethylenetetramine, and the mixture cast into a metal mold. A second casting is prepared in the same manner except that 100 grams of the polythiol obtained in Example V are added. The two castings are allowed to cure overnight at room temperature. The first casting is found to be brittle, with limited resistance to impact. In contrast, the second casting, having the polythiol, is found to be highly resilient with high resistance to impact.

EXAMPLE XII 90 grams of the polythiol obtained in Example VI are thoroughly blended with two grams of N,N,N',N' tetramethyl butylene diamine, 100 grams of carbon black, and 10 grams of epoxy resin (EPON 828). The mixture is cast into a metal mold, and allowed to cure overnight at room temperature. Upon examination, the casting is found to be very flexible with a high degree of extensibility, and a Shore A hardness of 50.

The polythiols or thiol-bearing polyethers of the present invention are characterized by a molecular weight of at least about 1000 and a theoretical thiol:hydroxy ratio of more than one. The general formula of the present product may be represented as follows:

(16)

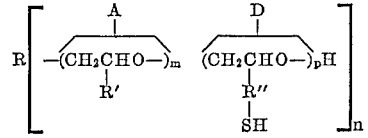

with the designated letters representing radicals, molecular units or integers as above defined (see Equation 1). Although it will be obvious to those of the art, it should be pointed out that where $n$ is greater than one the units within the brackets are not necessarily identical; that is, the various units incorporated on R may be identical—as in Example II above—or different—as the product of Formula 7 above. Further, although the letters $m$, $n$ and $p$ are defined as integers, it will be clear that a polythiol composition will contain many different molecular constituents, and that in the average molecule the above letters are likely not to be whole integers.

In order for the theoretical thiol:hydroxyl ratio to be more than one, the sum of D units—each containing one thiol—(plus any thiols on R) in most cases must be greater than $n$, for in accordance with the above Formula 15 there are $n$ hydroxyls in the molecule. Alternatively, however, the terminal hydrogen atom(s) may be replaced by an equivalent, non-functional radical, such as alkyl, which of course would result in an exception to the above-stated general rule.

As those skilled in the art appreciate, the theoretical thiol:hydroxyl ratios of the polythiols of the present process are not ordinarily obtained in practice. This inefficiency is primarily due to hydrolysis of the halogen groups, during conversion to thiols. Thus, the thiol:hydroxyl ratios achieved in practice are ordinarily somewhat less than the theoretical ratios, as for example shown above in Example VI. In any event, as a general rule, the polythiols of the present invention, having a relatively high theoretical thiol:hydroxyl ratio, are characterized by relatively high actual thiol:hydroxyl ratios as well, as demonstrated by the above examples. The actual thiol:hydroxyl ratio of the present polythiols is preferably greater than 0.50. The most preferred polythiols have an actual thiol:hydroxyl ratio of at least 0.70.

Preferably the sum of R and the total A units of Formula 15 is characterized by a molecular weight of at least about 700, as is the case in the examples above. In such a case, the incorporation of three moles of epichlorohydrin and subsequent conversion of the chlorines to thiols would yield a polythiol having a molecular weight of at least about 1000.

The present polythiols are derived from intermediate halogen-bearing polymers, wherein the halogen groups are located as desired along the polymer molecule, in accordance with the various methods above described. Of particular importance, the present method permits the preparation of such intermediates having internal halogens, in place of or in addition to terminal halohydrins. These intermediates may then be converted to polythiols having internal thiols, as well as, or in place of, terminal thiohydrins, and characterized by relatively high thiol:hydroxyl ratios. This of course adds significant versatility to the ultimate polythiols or cured products obtainable because of this invention. This also is a very desirable characteristic of the present process since polythiols are obtainable thereby with maximized hydrolytic stability. Consequently, the final products are notably of minimum water sensitivity.

I claim:
1. A polythiol composition, having a molecular weight of at least about 1000 and a theoretical thiol: hydroxyl ratio of more than 1, of the following molecular structure:

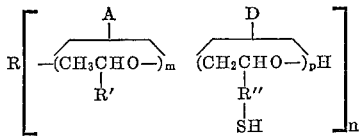

wherein A and D are representative polymeric units, repeating, alternating or both, with either A or D attached to R;

R is an organic radical derivable by the removal of at least one hydrogen atom from an organic compound having one or more active hydrogen atoms, R' is a hydrogen, alkyl or aryl radical, and R'' is an alkylene radical; and $m$ is zero or a positive integer, $p$ is a positive integer, and $n$ is equal to the number of hydrogen atoms removed to form R.

2. The composition of claim 1, wherein R is derived from an organic compound of the group consisting of aliphatic alcohols, haloalcohols, phenols, carboxylic acids, alcohol ethers, hydroxyl-terminated polyethers and polyesters, carboxyl-terminated polyesters, and hydroxyalkyl amines.

3. The composition of claim 1, wherein R'' is methylene.

4. The composition of claim 1, wherein R' is a hydrogen or methyl radical.

5. The composition of claim 1, maintained at a pH of about 4–7 by means of boric acid as a stabilizer.

6. The composition of claim 1, wherein R is derived from a propylene ether diol having a molecular weight of at least 1000, $n$ is two, $p$ is one for one unit attached to R and two for the other unit such that the average $p$ is 1.5, and the resulting product is characterized by an actual thiol:hydroxyl ratio of at least 0.70.

7. The composition of claim 6, wherein the propylene ether diol has a molecular weight of at least 3000.

8. A cured polymer product resulting from the reaction of the composition of claim 1 and an oxidizing agent, or an epoxy resin.

9. A cured polymer product resulting from the reaction of the composition of claim 6 and an oxidizing agent, or an epoxy resin.

10. A cured polymer product resulting from the reaction of the composition of claim 7 and an oxidizing agent or an epoxy resin.

References Cited

UNITED STATES PATENTS

| | | | |
|---|---|---|---|
| 3,258,495 | 6/1966 | Le Fave et al. | 260—609 |
| 3,278,496 | 10/1966 | Le Fave et al. | 260—79 |
| 3,361,723 | 1/1968 | Ephraim | 260—79 |

DONALD E. CZAJA, Primary Examiner

M. I. MARQUIS, Assistant Examiner

U.S. Cl. X.R.

117—161; 260—2, 28, 37, 47, 79, 79.1, 609